US012656747B2

(12) United States Patent　　(10) Patent No.:　US 12,656,747 B2
Zhang et al.　　　　　　　　　(45) Date of Patent:　　Jun. 16, 2026

(54) OPERATING METHOD FOR PHOTOVOLTAIC SYSTEM, AND CONTROL ASSEMBLY, STORAGE MEDIUM AND ELECTRIC MOTOR DRIVING SUBSYSTEM

(71) Applicant: HAOSOLAR LTD, Yixing City Wuxi (CN)

(72) Inventors: Haiping Zhang, Wuxi (CN); Caijun Gu, Wuxi (CN); Chuan Ping, Wuxi (CN); Liqiang Xu, Wuxi (CN)

(73) Assignee: HAOSOLAR LTD, Yixing City (CN)

( * ) Notice: Subject to any disclaimer, the term of this patent is extended or adjusted under 35 U.S.C. 154(b) by 551 days.

(21) Appl. No.: 18/250,748

(22) PCT Filed: Feb. 19, 2021

(86) PCT No.: PCT/CN2021/076897
　§ 371 (c)(1),
　(2) Date: Sep. 11, 2023

(87) PCT Pub. No.: WO2022/088558
　PCT Pub. Date: May 5, 2022

(65) Prior Publication Data
　US 2025/0306550 A1　Oct. 2, 2025

(30) Foreign Application Priority Data
　Oct. 28, 2020　(CN) ......................... 202011172014.3

(51) Int. Cl.
　*G05B 15/02*　　(2006.01)
　*F16C 35/06*　　(2006.01)
　　　(Continued)

(52) U.S. Cl.
　CPC .............. *G05B 15/02* (2013.01); *F16C 35/06* (2013.01); *H02S 20/30* (2014.12); *H02S 50/00* (2013.01)

(58) Field of Classification Search
　CPC ......... G05B 15/02; H02S 20/30; H02S 50/00; F16C 35/06
　See application file for complete search history.

(56) References Cited

U.S. PATENT DOCUMENTS 7,019,496 B1 * 3/2006 Garretson ............... H02P 9/102
　　　　　　　　　　　　　　　　　　322/29
8,944,413 B1 * 2/2015 Hatch ...................... B63C 3/06
　　　　　　　　　　　　　　　　　　254/323
　　　　　　　(Continued)

FOREIGN PATENT DOCUMENTS

CN　　102035435 A　　4/2011
CN　　109494856 A　　3/2019
　　　　　(Continued)

OTHER PUBLICATIONS

International Search Report (PCT/CN2021/076897); Date of Mailing: May 26, 2021.
　　　　　　(Continued)

*Primary Examiner* — Hussein Elchanti
(74) *Attorney, Agent, or Firm* — Wiersch Law Group

(57)　　　　　ABSTRACT

An operating method for a photovoltaic system, and a control assembly, a storage medium and an electric motor driving subsystem. The operating method for a photovoltaic system comprises the following steps: determining whether electrical energy available for an electric motor driving assembly to use is in a first state; and the electric motor driving assembly driving an adjustable support assembly to move to a first position when the electrical energy is in the first state, wherein the first state indicates that electrical energy generated by a photovoltaic panel assembly is sufficient for driving the adjustable support assembly to move, or indicates that electrical energy generated and stored by the photovoltaic panel assembly is sufficient for driving the adjustable support assembly to move. The electric motor (Continued)

driving assembly is mainly powered by the photovoltaic panel assembly, thereby providing a low-cost implementation means.

9 Claims, 5 Drawing Sheets

(51) Int. Cl.
      *H02S 20/30*          (2014.01)
      *H02S 50/00*          (2014.01)

(56)                    References Cited

U.S. PATENT DOCUMENTS

| | | | | |
|---|---|---|---|---|
| 2012/0227729 | A1 | 9/2012 | Lundahl et al. | |
| 2014/0285005 | A1* | 9/2014 | Casteel | H02S 10/40 |
| | | | | 320/101 |

| | | | | |
|---|---|---|---|---|
| 2017/0093329 | A1 | 3/2017 | Jensen | |
| 2020/0140247 | A1* | 5/2020 | Jaipaul | B66F 3/46 |
| 2021/0146818 | A1* | 5/2021 | Yakovlev | B60P 3/025 |
| 2023/0234456 | A1* | 7/2023 | Messina | B60L 53/53 |
| 2024/0154569 | A1* | 5/2024 | Iannuzzi | H02S 30/10 |
| 2025/0306550 | A1* | 10/2025 | Zhang | F16C 35/06 |
| 2025/0341107 | A1* | 11/2025 | Newberg | E04H 4/129 |

FOREIGN PATENT DOCUMENTS

| | | | |
|---|---|---|---|
| CN | 109495063 | A | 3/2019 |
| CN | 112271990 | A | 1/2021 |
| CN | 112350648 | A | 2/2021 |

OTHER PUBLICATIONS

First Office Action(CN202011172014.3); Date of Mailing: Jul. 16, 2021.

* cited by examiner

A—A

OPERATING METHOD FOR PHOTOVOLTAIC SYSTEM, AND CONTROL ASSEMBLY, STORAGE MEDIUM AND ELECTRIC MOTOR DRIVING SUBSYSTEM

CROSS-REFERENCE TO RELATED APPLICATION

The present disclosure is a National Phase of International Patent Application No. PCT/CN2021/076897, filed on Feb. 19, 2021, which claims priority to Chinese Patent Application No. 202011172014.3, filed on Oct. 28, 2020, the contents of which are incorporated herein by reference in their entireties.

TECHNICAL FIELD

The present disclosure relates to the technical field of solar energy and, in particular, to an operating method for a photovoltaic system, a control assembly, a storage medium, and a motor driving subsystem.

BACKGROUND

In the prior art, a photovoltaic system may include a photovoltaic panel assembly and an adjustable support assembly. The photovoltaic panel assembly is mainly used to convert solar or light energy into electrical energy. The adjustable support assembly support the photovoltaic panel assembly and is mainly used to adjust the orientation of the photovoltaic panel assembly. It can be understood that the sun rises in the east and sets in the west periodically relative to the earth. In order to improve the efficiency of solar energy reception, the orientation of the photovoltaic panel assembly can be periodically adjusted. The adjustment cycle of one type of photovoltaic panel assembly can be in the unit of days, while the adjustment cycle of another type of photovoltaic panel assembly can be in the unit of years.

During implementation of the prior art, the inventor found that:

For the photovoltaic panel assembly with the adjustment cycle in days, an electric motor is needed to drive the adjustable support assembly to move. In this way, the motor in the photovoltaic system rotates periodically, which requires high levels of service life of the motor and operational reliability, resulting in a high implementation cost for the photovoltaic system.

For the photovoltaic panel assembly with the adjustment cycle in years, the photovoltaic panel assembly is mainly adjusted manually. A large area of photovoltaic system is mainly mounted on plains with abundant solar energy resources. For example, the orientation of the photovoltaic panel assembly is adjusted according to the four seasons of spring, summer, autumn, and winter in each year. In each season, operators need to be specifically dispatched to the mounting site of the photovoltaic system to adjust the orientation of the photovoltaic panel assembly, which also results in relatively high labor cost.

Therefore, it is necessary to provide a technical solution for the photovoltaic system with low implementation cost.

SUMMARY

Embodiments of the present disclosure provide a technical solution with low implementation cost to solve the technical problem of high implementation cost for the photovoltaic system.

Embodiments of the present disclosure provide an operating method for a photovoltaic system according to the present disclosure, including: determining whether electrical energy available for a motor driving assembly is in a first state; and driving, by the motor driving assembly, an adjustable support assembly to move to a first position when the electrical energy is in the first state. The first state indicates that the electrical energy generated by a photovoltaic panel assembly is sufficient to drive the adjustable support assembly to move, or indicates that the electrical energy generated and stored by the photovoltaic panel assembly is sufficient to drive the adjustable support assembly to move.

In one or more embodiments, the first position is determined according to a spatiotemporal condition of the photovoltaic system, and the method further includes: driving, by the motor driving assembly, the adjustable support assembly in a one-time manner to move to the first position when the electrical energy available for the motor driving assembly is restored to the first state.

In one or more embodiments, the method further includes: continuously driving, by the motor driving assembly, the adjustable support assembly to move to the first position. An angular velocity of rotation of the adjustable support assembly is less than 4 degrees per minute.

In one or more embodiments, the method further includes: intermittently driving, by the motor driving assembly, the adjustable support assembly to move to the first position. An angular velocity of rotation of the adjustable support assembly is less than 4 degrees per minute.

Embodiments of the present disclosure provide a control assembly for controlling a motor driving assembly to drive an adjustable support assembly to move in a preset motion, the control assembly is configured to control a mode in which a photovoltaic panel assembly supplies electrical energy to the motor driving assembly, when the electrical energy supplied by the photovoltaic panel assembly is in a first state, the control assembly is configured to control the motor driving assembly to drive the adjustable support assembly to a first position. The first state indicates that the electrical energy generated by the photovoltaic panel assembly is sufficient to drive the adjustable support assembly to move, or indicates that the electrical energy generated and stored by the photovoltaic panel assembly is sufficient to drive the adjustable support assembly to move.

In one or more embodiments, the first position is determined according to a spatiotemporal condition of the photovoltaic system, when the electrical energy available for the motor driving assembly is restored to the first state, the motor driving assembly is configured to drive the adjustable support assembly in a one-time manner to move to the first position.

In one or more embodiments, the control assembly further includes a communication interface for updating an operating program of the control assembly.

In one or more embodiments, the control assembly further includes a storage module for storing an operating program of the control assembly.

Embodiments of the present disclosure provide a storage medium having stored an operating program of a control assembly, configured to implement following steps when the operating program is executed: determining whether electrical energy available for a motor driving assembly is in a first state; and driving, by the motor driving assembly, an adjustable support assembly to move to a first position when the electrical energy is in the first state. The first state indicates that the electrical energy generated by a photovoltaic panel assembly is sufficient to drive the adjustable support assembly to move, or indicates that the electrical energy generated and stored by the photovoltaic panel assembly is sufficient to drive the adjustable support assembly to move.

Embodiments of the present disclosure provide a motor driving subsystem for driving, by utilizing electrical energy provided by a photovoltaic panel assembly, an adjustable support assembly to move to adjust an orientation of the photovoltaic panel assembly, including: a motor driving assembly for driving the adjustable support assembly to move in a preset motion; and a control assembly, electrically connected to the motor driving assembly, for controlling the motor driving assembly to adjust the adjustable support assembly in the preset motion, the control assembly is electrically connected to the photovoltaic panel assembly.

The above embodiments according to the present disclosure have at least the following advantages: the motor driving assembly is mainly powered by the photovoltaic panel assembly, which provides an implementation with low cost.

BRIEF DESCRIPTION OF DRAWINGS

The drawings described herein are intended to provide a further understanding of the present disclosure and form a part thereof. The illustrative embodiments of the present disclosure and their explanations are used to explain the present disclosure and do not constitute inappropriate limitations for the present application. In the drawings.

Figure 1:
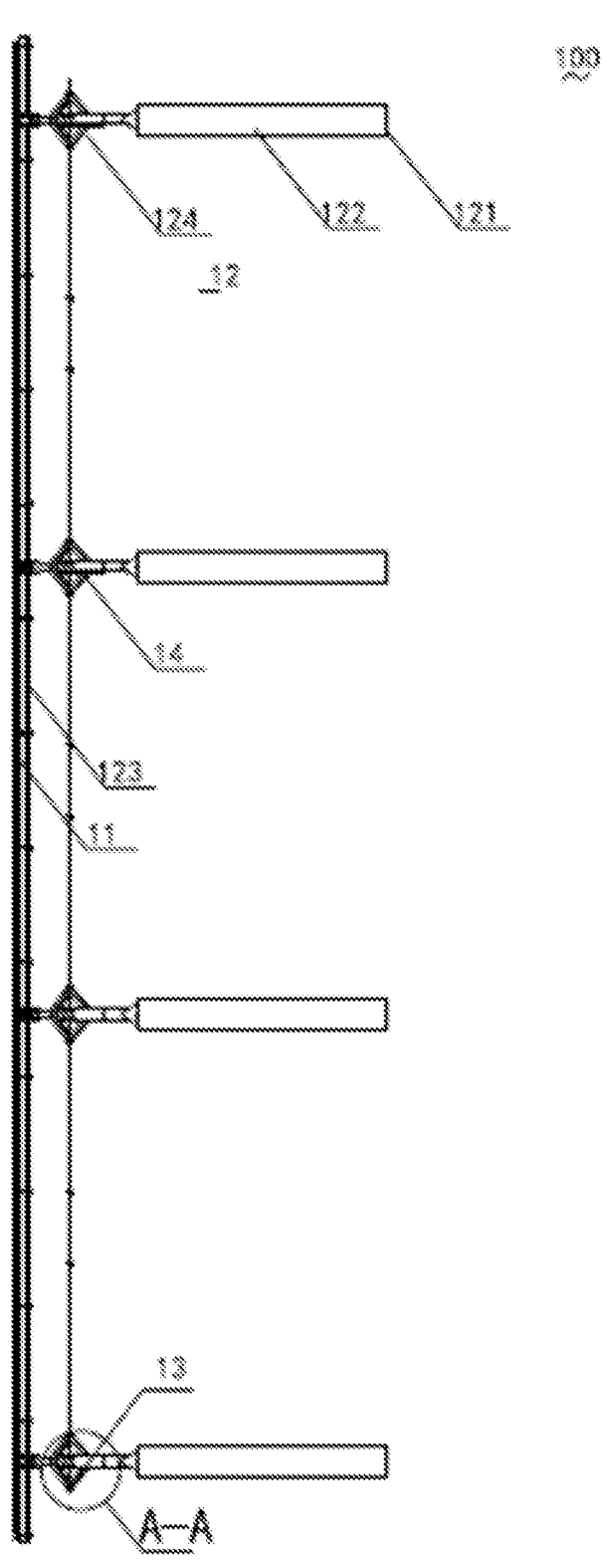
FIG. 1 is a structural schematic diagram of a photovoltaic system according to an embodiment of the present disclosure.

100 photovoltaic system
101 adjusting support subsystem
102 motor driving subsystem
11 photovoltaic panel assembly
12 adjustable support assembly
121 securing foot
122 supporting leg
123 bracket
124 adjusting mechanism
13 motor driving assembly
14 control assembly

DESCRIPTION OF EMBODIMENTS

In order to make the purpose, technical solutions, and advantages of the present disclosure clear, the following will provide a clear and complete description of the technical solutions of the present disclosure in conjunction with embodiments and corresponding drawings. It is appreciated that, the described embodiments are only a portion of the embodiments of the present disclosure, not the whole. Based on the embodiments of the present disclosure, all other embodiments obtained by those skilled in the art without any creative effort fall within the protection scope of the present disclosure.

As shown in FIG. 1, the present disclosure discloses a photovoltaic system 100, including: a photovoltaic panel assembly 11 for converting light energy into electrical energy; an adjustable support assembly 12 for supporting the photovoltaic panel assembly 11 and changing an orientation of the photovoltaic panel assembly 11 in an adjustable manner to receive the light energy at an appropriate angle; a motor driving assembly 13 for driving the adjustable support assembly 12 to move in a preset motion; and a control assembly 14 electrically connected to the photovoltaic panel assembly 11 and the motor driving assembly 13, for controlling the motor driving assembly 13 to adjust the adjustable support assembly 12 in a preset motion. The photovoltaic panel assembly 11 is electrically connected to the motor driving assembly 13, and the motor driving assembly 13 is mainly powered by the photovoltaic panel assembly 11.

The photovoltaic panel assembly 11 is configured to convert the light energy into the electrical energy. The photovoltaic panel assembly 11 can be mainly made of polycrystalline silicon or monocrystalline silicon, or other semiconductor materials having photoelectric effect. The sunlight irradiates on the photovoltaic panel assembly 11 and is absorbed at an interface layer of the photovoltaic panel assembly 11. The photovoltaic panel assembly 11 made of semiconductor materials has a PN junction. Photons with sufficient energy in the absorbed sunlight can excite electrons in the PN junction from covalent bonds, so as to produce electron-hole pairs. Electrons and holes near the interface layer are separated from each other under the electric field effect of space charges before recombination. The charge separation of the interface layer generates an outward measurable voltage at both ends of the PN junction. The more electron-hole pairs generated by sunlight on the interface layer of the photovoltaic panel assembly 11, the greater the current. The more light energy absorbed by the interface layer of the photovoltaic panel assembly 11, the larger the irradiated area of the interface layer, i.e., the photovoltaic panel assembly 11, and the greater the current generated by the photovoltaic panel assembly 11. The current generated by the photovoltaic panel assembly 11 can be collected through a converging wire and used as a power source.

The adjustable support assembly 12 is configured to support the photovoltaic panel assembly 11 and can change the orientation of the photovoltaic panel assembly 11 in an adjustable manner to receive the light energy at the appropriate angle.

Figure 2:
FIG. 2 is a structural schematic diagram of another photovoltaic system according to an embodiment of the present disclosure.
Figure 2:
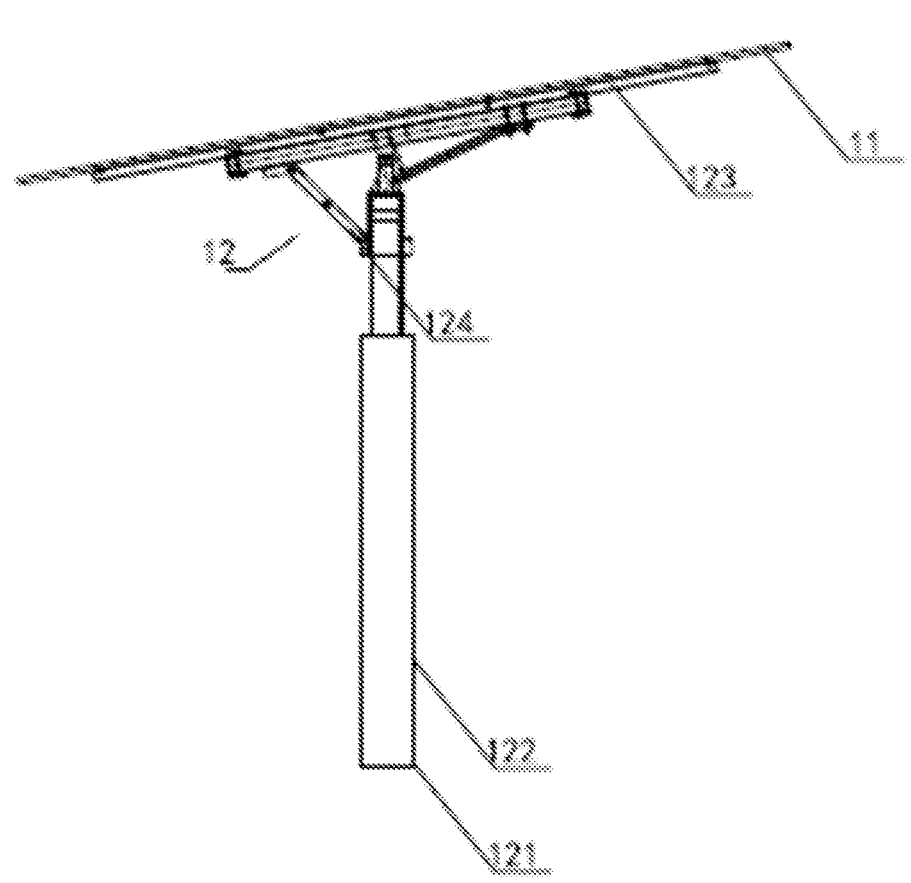

As shown in FIG. 2, which is structural schematic diagram of another photovoltaic system according to the present disclosure. The adjustable support assembly 12 includes a securing foot 121 that can be fixed to the ground, a supporting leg 122 connected to the securing foot 121, a bracket 123 that can pivot relative to the supporting leg 122, and an adjusting mechanism 124 provided between the bracket 123 and the supporting leg 122.

It can be understood that, the securing foot 121 herein is not a necessary structure. The securing foot 121 may be fixed to the ground in various forms. In some embodiments, in order to strengthen the supporting structure, the securing foot 121 herein may be partially buried underground and only exposes a part thereof to connect the supporting leg 122. The securing foot 121 may be a concrete pier or a metal block, and may also be made of other materials or composite materials. In some embodiments, the securing foot 121 may be a rod-shaped member extending in a longitudinal direction, or a securing feet array formed by several fixed feet 121.

The supporting leg 122 is connected to the securing foot 121. The supporting leg 122 is mainly configured to provide a supporting force for the photovoltaic panel assembly 11. There are various ways to connect the supporting leg 122 to the securing foot 121. In some embodiments, the supporting leg 122 and the securing foot 121 can also be pivotally connected to each other. As shown in FIG. 2, the securing foot 121 can be formed by two rod-shaped parts provided parallel to each other. Alternatively, the array can be formed by at least two securing feet 121 provided approximately parallel to each other. Correspondingly, two supporting legs 122 or two rows of supporting legs 122 are provided. One side of the supporting leg 122 is connected to the securing foot 121. The other side of the supporting leg 122 provided in pairs is pressed against each other to form a supporting part. The supporting part may be a line-shaped support or formed by arranging several supporting points in a linear manner. In this way, the supporting part and the securing foot 121 jointly constitute three vertices of a triangle. In this way, the photovoltaic panel assembly 11 is supported, in the vertical direction, by the securing foot 121. When the orientation of the photovoltaic panel assembly 11 is different, or when the photovoltaic panel assembly 11 is biased, the torque and bias force thereof are balanced by a connection mechanism between the supporting leg 122 and the securing foot 121. Further, in order to maintain the stability of the supporting structure formed by the supporting leg 122 and the securing foot 121 provided in pairs, a reinforcing rod can be provided at the approximate middle position thereof in the extending direction of the supporting leg 122.

Figure 3:
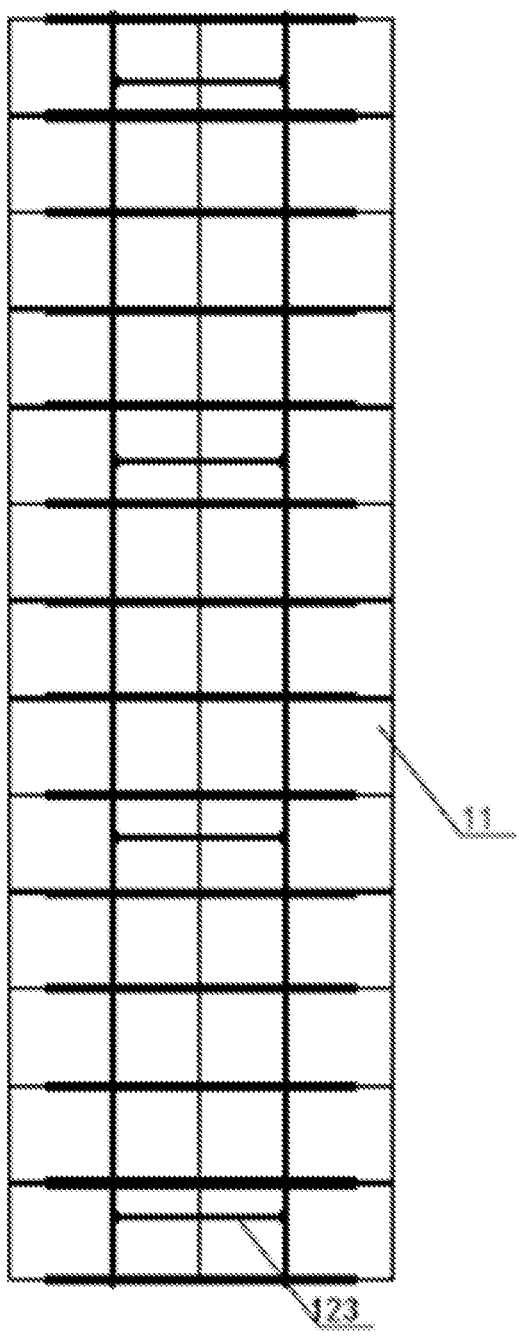
FIG. 3 is a structural schematic diagram of a photovoltaic panel assembly supported by a bracket according to an embodiment of the present disclosure.

As shown in FIG. 3, another perspective of the bracket 123 is provided.

The bracket 123 is directly used to support the photovoltaic panel assembly 11. The bracket 123 can pivot relative to the supporting leg 122. The bracket 123 may be a flat structure or a supporting frame formed by intersecting rod-shaped parts. The support frame can include a first beam extending in a first direction and a second beam extending in a second direction. The first and second beams can cross each other and be located in the same plane, or they can be stacked to form the depth of the photovoltaic panel assembly 11 in the support direction. The projections of the first and second beams on the ground can be either perpendicular to each other or not.

The bracket 123 can pivot relative to the supporting leg 122 as a whole, so as to form postures with different angles to the ground. When the bracket 123 forms different angles to the ground, the variation and limit thereof are achieved through the adjusting mechanism 124.

The adjusting mechanism 124 is provided between the bracket 123 and the supporting leg 122. The adjusting mechanism 124 is configured for rotation and positioning of the bracket 123 relative to the ground.

Figure 4:
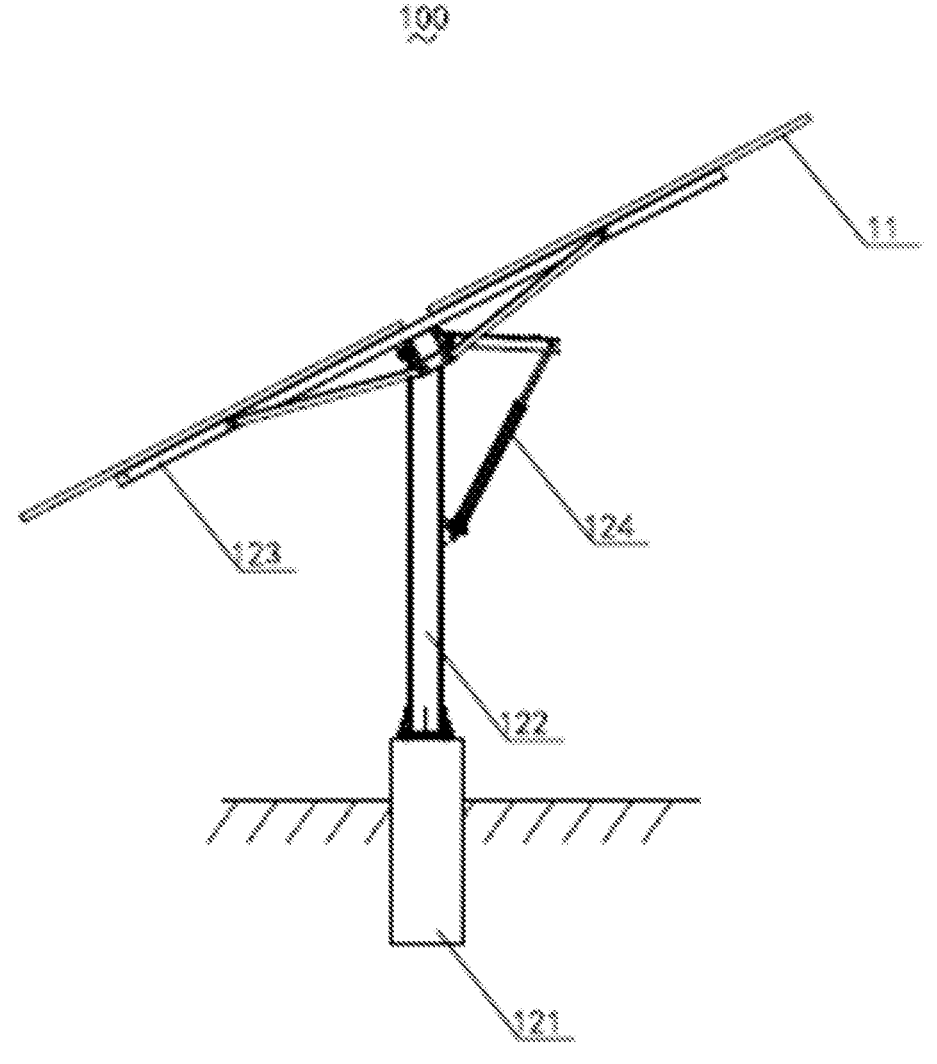
FIG. 4 is a structural schematic diagram of an adjustable support assembly according to an embodiment of the present disclosure.

As shown in FIG. 4, in some embodiments, the adjusting mechanism 124 can adopt a telescopic rod structure. One end of the telescopic rod is connected to the bracket 123, and the other end is connected to the supporting leg 122. The projections, in the side view, of two ends of the telescopic rod, the pivot point of the supporting part, i.e., the bracket 123, and the pivot axis constitute three vertices of the triangle. The projections, in the side view, of the telescopic rod, the bracket 123, and the supporting leg 122 constitute three edges of the triangle. Since the supporting leg 122 is relatively fixed, the angle between the bracket 123 and the supporting leg 122 can be changed by adjusting the length of the telescopic rod, thereby changing the angle between the bracket 123 and the ground. In some embodiments, the telescopic rod structure herein can include a worm gear and a worm. The rotation of the worm gear drives to change the relative position between the worm gear and the worm, and the change in the angle between the bracket 123 and the ground is ultimately achieved. The rotation of the worm gear herein can be achieved by the motor driving assembly 13.

Figure 5:
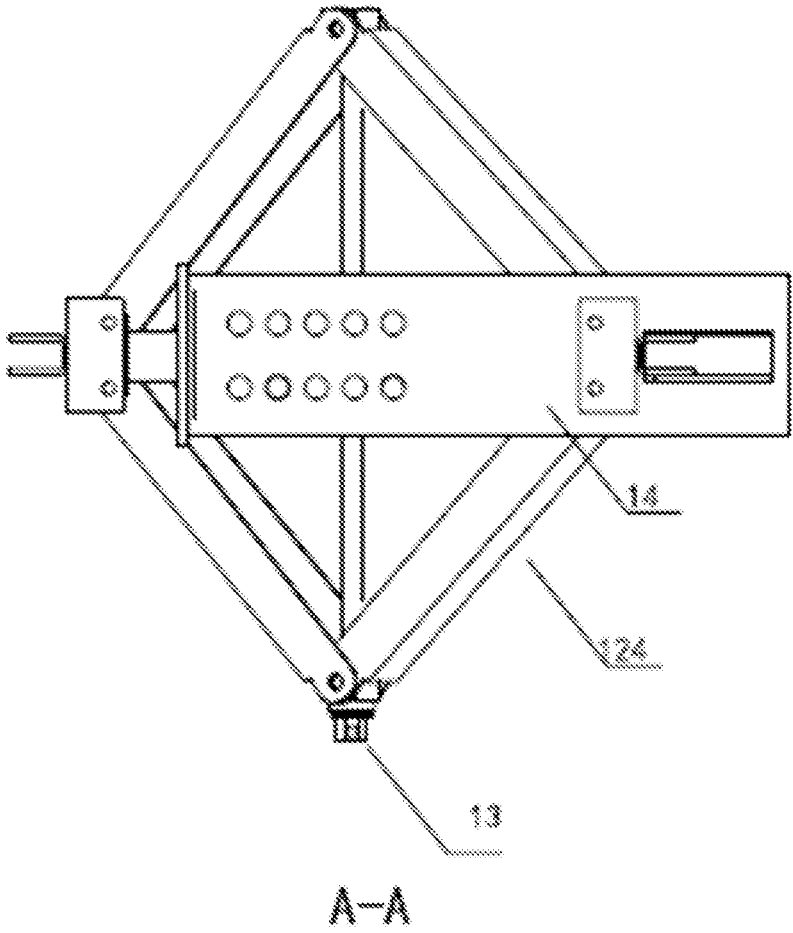
FIG. 5 is a partially enlarged view of A-A in FIG. 1.

As shown in FIG. 1 and FIG. 5, in some embodiments, the adjusting mechanism 124 can adopt a lifting jack structure. In this way, the adjusting mechanism 124 can essentially serve as a four-link structure, or be reflected as a diamond structure in the projection in the side view. One of the pair of vertices of the diamond is connected to the bracket 123, and the other of the pair of vertices is provided at the supporting leg 122. The projections, in the side view, of the pair of vertices of the diamond adjusting mechanism 124, the pivot point of the support, i.e., the bracket 123, and the pivot axis constitute three vertices of the triangle. The projection, in the side view, of the lifting jack, the bracket 123, and the supporting leg 122 constitute three edges of the triangle. Since the supporting leg 122 is relatively fixed, the angle between the bracket 123 and the supporting leg 122 can be changed by adjusting the angle of the diamond of the adjusting mechanism 124, thereby changing the angle between the bracket 123 and the ground.

In some embodiments, the adjusting mechanism 124 is realized by the lifting jack structure. By adjusting the spacing, in the direction perpendicular to the support direction of the photovoltaic panel assembly 11, between the vertices of the diamond, a projection length of the adjusting mechanism 124 on the side is changed. In some embodiments, there is an adjusting rod provided between the two vertices of the lifting jack structure. Through the rotation of the adjusting rod, the change of the spacing between the two vertices of the diamond adjusting mechanism 124 is achieved, and the change in the angle between the bracket 123 and the ground is ultimately achieved. The rotation of the adjusting rod can be achieved by the motor driving assembly 13.

The motor driving assembly 13 is configured to drive the adjustable support assembly 12 to move in a preset motion. The motor driving assembly 13 can include a motor and multiple levels of transmission devices. The power is ultimately transmitted by the transmission devices to the adjustable support assembly 12. The motor driving assembly 13 is electrically connected to the photovoltaic panel assembly 11, and the motor driving assembly 13 is mainly powered by the photovoltaic panel assembly 11.

It should be noted that the motor driving assembly 13 is mainly powered by the photovoltaic panel assembly 11. It can mainly be understood as "during normal use" and "according to the normal usage scenarios based on design". Except for special needs and engineering redundancy backup, all electrical energy required for the motor driving assembly 13 is supplied by the photovoltaic panel assembly 11.

The control assembly 14, electrically connected to the photovoltaic panel assembly 11 and the motor driving assembly 13, is configured to control the motor driving assembly 13 to adjust the adjustable support assembly 12 in a preset motion.

The control assembly 14 can be achieved through a single-chip microcomputer or a microprocessor with simple functions. In a typical configuration, the control assembly 14 can include one or more processors (CPU), input/output interfaces, network interfaces, and memory.

Memory may include volatile memory, random-access memory (RAM) and/or non-volatile memory in computer-readable medium, such as read-only memory (ROM) or flash RAM. Memory is served as an example of the computer-readable medium.

The computer-readable medium, including volatile and non-volatile, movable and non-movable media, can be used for information storage through any method or technology. Information can be computer-readable instructions, data structures, program assemblies, or other data. Examples of computer storage medium include, but are not limited to, phase-change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technologies, compact disc read-only memory (CD-ROM), digital versatile disc (DVD) or other optical storage, magnetic cassette tape, tape disk storage or other magnetic storage devices, or any other non-transmission medium, which can be used to store information that can be accessed by computing devices. According to the definition of the present disclosure, the computer-readable medium does not include transitory computer-readable media (transitory media), such as modulated data signals and carriers.

It should be pointed out that the manifestations of the control assembly 14 in specific applications can be single-chip microcomputers, microprocessors, integrated circuits, etc. These specific manifestations obviously do not constitute limitations on the protection scope of the present disclosure.

It should be reiterated that the motor driving assembly 13 is mainly powered by the photovoltaic panel assembly 11. It can mainly be understood as "during normal use" and "according to the normal usage scenarios based on design". Except for special needs and engineering redundancy backup, all electrical energy required for the motor driving assembly 13 is supplied by the photovoltaic panel assembly 11.

It should be emphasized that the motor can be specially customized.

For the photovoltaic panel assembly 11 that the orientation thereof is adjusted with an adjustment cycle in days, a motor is needed to drive the adjustable support assembly 12 to move. In this way, the motor in the photovoltaic system 100 rotates periodically, which has high requirements for the service life and operational reliability of the motor, resulting in a high implementation cost for the photovoltaic system 100. In addition, when the photovoltaic system 100 is designed, the adjustment cycle in days is taken into account. In order to improve the effective work done by the adjusting motor, it is necessary to reduce the weight of the bracket 123 as much as possible. In theory, the smaller the mass of the bracket, the higher the effective work done by the rotation of the photovoltaic panel assembly 11. That is, the photovoltaic system 100 with the adjustment cycle in days needs to be lightweight. When facing the need for wind resistance, the lightweight photovoltaic system 100 usually tends to choose a high-power motor. When there is the need for wind resistance, the orientation of the photovoltaic panel assembly 11 can be quickly adjusted to a wind resistant position through the high-power motor. Since the adjustment cycle of the photovoltaic panel assembly 11 is in days, the orientation of the photovoltaic panel assembly 11 can correspond to the position of the sun in one day, and the power generation efficiency is high. It can be understood that in terms of implementation in China, the photovoltaic panel assembly 11 with the adjustment cycle in days mainly indicates the orientation thereof is adjusted from east to west.

For the photovoltaic panel assembly 11 that the orientation thereof is adjust with an adjustment cycle in years, the adjustment of the photovoltaic panel assembly 11 is mainly carried out manually. The large are of photovoltaic system 100 is mainly mounted on plains with abundant solar energy resources. The adjustment cycle of the photovoltaic panel assembly 11 is in years, for example, the orientation adjustment of the photo panel assembly 11 is carried out according to the four seasons of spring, summer, autumn, and winter in each year, and a cycle is completed within one year. In each season, operators need to be specifically dispatched to the mounting site of the photovoltaic system 100 to adjust the orientation of the photovoltaic panel assembly 11, which also results in relatively high labor cost. In order to improve the efficiency of manual adjustment, the high-power motor is usually chosen during motor choosing. Otherwise, the adjustment time for one smallest unit in the photovoltaic system 100 is too long, for example, it takes 2 hours, which will exceed the limit of the operator's patience. It can be understood that in terms of implementation in China, the photovoltaic panel assembly 11 with the adjustment cycle in years mainly indicates the southward orientation thereof is adjusted. Here, the orientation adjustment means the angle between panel assembly and the ground is adjusted in different seasons.

In theory, compared with the photovoltaic panel assembly 11 that the orientation thereof is adjust with an adjustment cycle in years, the photovoltaic panel assembly 11 that the orientation thereof is adjust with an adjustment cycle in days has a higher power generation efficiency.

After long-term research, it has been found that:

Normally, compared with the photovoltaic panel assembly 11 that the orientation thereof is adjust with an adjustment cycle in years, the photovoltaic panel assembly 11 that the orientation thereof is adjust with an adjustment cycle in days has a higher power generation efficiency. However, for the photovoltaic panel assembly 11 that the orientation thereof is adjust with an adjustment cycle in days, the motor driving assembly 13 is required to have high product performance, which is specifically manifested in high operational stability and long service life. Once the motor driving assembly 13 fails, the photoelectric conversion efficiency of the photovoltaic panel assembly 11 will be greatly reduced. For the photovoltaic system usually in megawatts, the occurrence of faults during the entire design life cycle of the photovoltaic system is a high probability event due to the large number of the motor driving assembly 13 and the extremely long operating hours thereof.

Compared with the photovoltaic panel assembly 11 that the orientation thereof is adjust with an adjustment cycle in days, the photovoltaic panel assembly 11 that the orientation thereof is adjust with an adjustment cycle in years has a lower power generation efficiency. However, because the photovoltaic panel assembly 11 that the orientation thereof is adjust with an adjustment cycle in years only needs a limited number of adjustments within one year, it can be adjusted manually without the need to configure the high-quality motor driving assembly 13 on a large scale, such that the implementation cost is low, and the cost performance is relatively high. Even if the high-power motor is used to improve the adjustment efficiency, the number and duration of use of the motor driving assembly 11 are still relatively small. The configuration quantity of the motor driving assembly 13 can be consistent with the number of operators, and the one-time investment cost of the motor driving assembly 13 is still very limited, resulting in a relatively high cost performance of the power generation efficiency of the photovoltaic panel assembly 11 that the orientation thereof is adjust with an adjustment cycle in years. For the wind resistance requirement of the photovoltaic system 100 or the photovoltaic panel assembly 11, because the photovoltaic panel assembly 11 with an adjustment cycle in years has an extremely low requirement for the angular velocity of rotation, the stiffness and strength of the adjustable support assembly 12 need to be emphasized when designed, which is usually referred to as designing the adjustable support assembly 12 and the photovoltaic panel assembly 11 to be more robust.

After thorough research on two different implementations, it is found that:

Although under normal circumstances, compared with the photovoltaic panel assembly 11 that the orientation thereof is adjust with the adjustment cycle in years, the photovoltaic panel assembly 11 that the orientation thereof is adjust with the adjustment cycle in days has a higher power generation efficiency, once the failure probability of the motor driving assembly 11 is taken into account, for the photovoltaic system 100 in GW, compared with the photovoltaic panel assembly 11 that the orientation thereof is adjust with the adjustment cycle in years, the improvement ratio of the power generation efficiency of the photovoltaic panel assembly 11 that the orientation thereof is adjust with the adjustment cycle in days is about 1%~2%. Taking the design life cycle of the photovoltaic system 100 as 20 years, when the photovoltaic system 100 is operated for more than 10 years, the maintenance cost of the motor driving assembly 13, of the photovoltaic panel assembly 11 that the orientation thereof is adjust with the adjustment cycle in days, greatly increases. That is, overall, in the long term, the photovoltaic panel assembly 11 that the orientation thereof is adjust with the adjustment cycle in years has a more competitive advantage. However, the photovoltaic panel assembly 11 with the adjustment cycle in years has been widely applied, with its adjustment time concentrated in the days before and after the spring equinox, summer solstice, autumn equinox, and winter solstice. Near the centralized adjustment time, adjustment can effectively improve the photoelectric conversion efficiency of the photovoltaic system 100 with the adjustment cycle in years. Due to the limitation of the number of operators and the problem of future labor force reduction, the deployment and scale of the photovoltaic system 100 with the adjustment cycle in years are limited, and the cost of use will significantly increase in the future.

In some embodiments, a customized low-power motor is adopted to reduce the power demand of the motor driving assembly 11 and the one-time investment cost of the motor driving assembly 11. In this way, the large-scale deployment of the motor driving assembly 11 in the photovoltaic system 100 with the adjustment cycle in years becomes possible in terms of commercial cost. In some embodiments, as the orientation adjustment of the photovoltaic panel assembly 11 is automatically controlled by the control assembly 14, it is possible to complete a 1-degree orientation change within the period from sunset to sunrise, such as 12 hours. Therefore, the requirement for power of the motor is extremely low, which greatly reduces the implementation cost of the photovoltaic system 100.

Meanwhile, in order to reduce the dependence of the photovoltaic system 100, of the photovoltaic panel assembly 11 with the adjustment cycle in years, on the number of operators, the motor driving assembly 13 herein is electrically connected to the photovoltaic panel assembly 11, and the motor driving assembly 13 is mainly powered by the photovoltaic panel assembly 11. This is not possible in the past. For the photovoltaic panel assembly 11 that the orientation thereof is adjusted with the adjustment cycle in days, when there is a need for wind resistance and the illumination condition is insufficient, if there is no external power supply, the photovoltaic panel assembly 11 cannot be adjusted to an appropriate wind resistance angle, and is extremely vulnerable to damage. For the photovoltaic panel assembly 11 that the orientation thereof is adjusted with the adjustment cycle in years, due to the concentration of the adjustment time window, if external power is not provided and the illumination condition is insufficient within the adjustment time window, the adjustment task of the photovoltaic panel assembly 11 cannot be completed.

In some embodiments, since the power of the motor in the motor driving assembly is extremely low, the adjustment cycle of the photovoltaic panel assembly 11 is in years, and the control assembly 14 is electrically connected to the photovoltaic panel assembly 11 and the motor driving assembly 13, therefore, the control assembly 14 only needs to be configured to complete the orientation adjustment of the photovoltaic panel assembly 11 under the allowable illumination condition. In this case, the electrical energy generated by the photoelectric conversion performed by the photovoltaic panel assembly 11 is sufficient to complete the orientation adjustment of the photovoltaic panel assembly 11, without the involvement of operators and the external power supply, thus the implementation cost of the photovoltaic system 100 is low.

Further, within one adjustment cycle of the adjustable support assembly 12, more than 85% of the required energy is supplied by the photovoltaic panel assembly 11.

Assuming that the energy required for adjusting the orientation of the photovoltaic panel assembly 11 in one year is N joules, or the energy required for pivoting some parts in the adjustable support assembly 12 is N joules, the energy supplied by the photovoltaic panel assembly 11 can reach 0.85N joules. That is, the engineering redundancy of energy is less than 15%. That is, setting an invalid power supply or setting a power supply only for the engineering redundancy backup by those skilled in the art should obviously not be considered out of the protection scope of the present disclosure.

Further, in some embodiments, the energy required for the adjustable support assembly 12 within one adjustment cycle is fully supplied by the photovoltaic panel assembly 11.

The energy required for pivoting some parts in the adjustable support assembly 12 is fully supplied by the energy immediately generated by the photovoltaic panel assembly 11 or the energy stored in the early stage by the photovoltaic panel assembly 11.

Further, in some embodiments, the photovoltaic system 100 is further provided with a clutch assembly for transmitting and disengaging a driving force of the motor driving assembly 13 for driving the adjustable support assembly 12. When the motor driving assembly 13 is in a disengagement state with the adjustable support assembly 12, the driving force of the motor driving assembly 13 cannot be transmitted to the adjustable support assembly 12. When the motor driving assembly 13 is in an engagement state with the adjustable support assembly 12, the driving force of the motor driving assembly 13 is transmitted to the adjustable support assembly 12.

The photovoltaic system 100 is further provided with a clutch assembly for switching the supply mode of the energy required for pivoting some parts in the adjustable support assembly 12. For example, when the motor driving assembly 13 is in a disengagement state with the adjustable support assembly 12, the driving force of the motor driving assembly 13 cannot be transmitted to the adjustable support assembly 12, and this mode is usually used in the case that the electrical energy is supplied by the photovoltaic panel assembly 11. When the motor driving assembly 13 is in the disengagement state with the adjustable support assembly 12, the driving force of the motor driving assembly 13 cannot be transmitted to the adjustable support assembly 12, and this mode is used in the case of manual operation. By providing the clutch assembly, the application range of the photovoltaic system 100 can be increased.

In some embodiments, an adjusting support subsystem 101 for adjusting an orientation of the photovoltaic panel assembly 11 is provided, including: an adjustable support assembly 12 for supporting the photovoltaic panel assembly 11 and changing the orientation of the photovoltaic panel assembly 11 in an adjustable manner to receive light energy at an appropriate angle; a motor driving assembly 13 for driving the adjustable support assembly 12 to move in a preset motion; and a control assembly 14 electrically connected to the photovoltaic panel assembly 11 and the motor driving assembly 13, for controlling the motor driving assembly 13 to adjust the adjustable support assembly 12 in a preset motion. The motor driving assembly 13 is provided with an electrical interface that can be connected to the photovoltaic panel assembly 11. Energy required for the motor driving assembly 13 is mainly input from the electrical interface.

The adjustable support assembly 12, the motor driving assembly 13, and the control assembly 14 in the adjusting support subsystem 101 can be the same or different from those in the photovoltaic system 100. The adjusting support subsystem 101 is mainly suitable for products that are individually packaged after stripping the photovoltaic panel assembly 11 from the photovoltaic system 100. The manufacturer of the adjusting support subsystem 101 is usually the integrator for the adjustable support. The motor driving assembly 13 is provided with an electrical interface that can be connected to the photovoltaic panel assembly 11. The voltage range of the electrical interface can be equivalent to a DC voltage interface below 48V. The specific forms of the electrical interface can be various pin types. The types and forms of the electrical interface of the motor driving assembly 13 obviously do not constitute substantial limitations on the protection scope of the present disclosure.

Further, in some embodiments, more than 85% of the energy required for the adjustable support assembly within one adjustment cycle is supplied by the photovoltaic panel assembly 11.

Further, in some embodiments, all the energy required for the adjustable support assembly 12 within one adjustment cycle is supplied by the photovoltaic panel assembly 11.

Further, in some embodiments, the photovoltaic system 100 is further provided with a clutch assembly for transmitting and disengaging a driving force of the motor driving assembly 13 for driving the adjustable support assembly 12. When the motor driving assembly 13 is in a disengagement state with the adjustable support assembly 12, the driving force of the motor driving assembly 13 cannot be transmitted to the adjustable support assembly 12. When the motor driving assembly 13 is in an engagement state with the adjustable support assembly 12, the driving force of the motor driving assembly 13 is transmitted to the adjustable support assembly 12.

A control assembly 14 is provided by the present disclosure for controlling a motor driving assembly 13 to drive an adjustable support assembly 12 to move in a preset motion. The control assembly 14 is used to control a mode in which a photovoltaic panel assembly 11 supplies electrical energy to the motor driving assembly 13. When the electrical energy supplied by the photovoltaic panel assembly 11 is in a first state, the control assembly 14 controls the motor driving assembly 13 to drive the adjustable support assembly 12 to a first position.

The control assembly 14 is configured to control the motor driving assembly 13 to drive the adjustable support assembly 12 in the preset motion. In some embodiments, the specific implementer of the control assembly 14 may be a hardware manufacturer of single-chip microcomputers, microprocessors, or integrated circuit boards, or a software service provider using integrated circuit editing programs.

Further, in some embodiments, the control assembly 14 further includes a communication interface for updating an operating program of the control assembly 14.

The communication interface herein is mainly configured to update the operating program of the control assembly 14. All communication interfaces with this function should not be considered outside the protection scope of the present disclosure. The communication interface herein can be physical or virtual. The physical communication interface can be represented as a USB interface, RJ45 interface, Type-C interface, lightning interface, etc., in the implementation thereof. The virtual communication interface can be represented as a network virtual addresses, call function of the interface, etc., in the implementations thereof.

Further, in some embodiments, the control assembly 14 further includes a storage assembly for storing the operating program of the control assembly 14.

It can be understood that the setting of the storage assembly can reduce the problem of data loss during the transmission of the operating program, which facilitates the control assembly 14 to operate with high stability. Moreover, when there is a problem with the operating program of the control assembly 14 or a network failure occurs, the operation of the control assembly 14 can be restored in a timely manner through the storage medium.

Further, a storage medium according to the present disclosure having stored an operating program of a control assembly 14 is provided, which is used to implement the following steps when the operating program is executed: a determination that whether electrical energy available for a motor driving assembly 13 is in a first state is performed; and when the electrical energy is in the first state, an adjustable support assembly 12 is driven by the motor driving assembly 13 to move to a first position. The first state indicates that the electrical energy generated by the photovoltaic panel assembly 11 is sufficient to drive the adjustable support assembly 12 to move. Alternatively, the first state indicates that the electrical energy generated and stored by the photovoltaic panel assembly 11 is sufficient to drive the adjustable support assembly 12 to move.

The storage medium herein may be in various forms such as USB flash disk, optical disk, and cloud storage server in the implementation of the present disclosure.

Further, a motor driving subsystem 102 according to the present disclosure used to drive, by utilizing electrical energy provided by a photovoltaic panel assembly 11, an adjustable support assembly 12 to move to adjust an orientation of the photovoltaic panel assembly 11 is provided, including: a motor driving assembly 13 for driving the adjustable support assembly 12 to move in a preset motion; and a control assembly 14, electrically connected to the motor driving assembly 13, for controlling the motor driving assembly 13 to adjust the adjustable support assembly 12 in a preset motion. The control assembly 14 can be electrically connected to the photovoltaic panel assembly 11.

Further, in some embodiments, the control assembly 14 is encapsulated inside the motor driving assembly 12.

The configuration of the motor driving subsystem 102 herein is reflected in the fact that the motor driving assembly 13 and the control assembly 14 appear together. The control assembly 14 can be connected to the motor driving assembly 13 through an assembly structure, or can be directly encapsulated in the motor driving assembly 13 during the production process. The motor driving subsystem 102 can facilitate centralized procurement and use by users. Moreover, manufacturers can perform collaborative detecting and matching between the two assemblies during manufacturing to improve the control accuracy of the motor driving assembly 13.

Further, in some embodiments, the first state indicates that the electrical energy generated by the photovoltaic panel assembly 11 is sufficient to drive the adjustable support assembly 12 to move; or the first state indicates that the electrical energy generated and stored by the photovoltaic assembly is sufficient to drive the adjustable support assembly 12 to move.

When the electrical energy supplied by the photovoltaic panel assembly 11 is in the first state, the control assembly 14 controls the motor driving assembly 13 to drive the adjustable support assembly 12 to the first position.

The first state indicates that the electrical energy generated by the photovoltaic panel assembly 11 is sufficient to drive the adjustable support assembly 12 to move. Alternatively, the first state indicates that the electrical energy generated and stored by the photovoltaic panel assembly 11 is sufficient to drive the adjustable support assembly 12 to move.

The first state can be further limited such that the electric energy generated by the photovoltaic panel assembly 11 is sufficient to drive the adjustable support assembly 12 to move to the first position. Alternatively, the electrical energy generated and stored by the photovoltaic panel assembly 11 is sufficient to drive the adjustable support assembly 12 to move to the first position.

The first position can correspond to the area defined by the latitude and longitude of the day, such that the orientation of the photovoltaic panel assembly 11 is directly facing the sun at 12:00 in the noon. In other words, the orientation of the photovoltaic panel assembly 11 is convenient for it to be directly illuminated by the sun at 12:00 in the noon. The first position can also be defined through other spatiotemporal conditions.

In some embodiments, a sequence composed of several first positions is determined according to the longitude and latitude of the photovoltaic system 100 and the solar term phenology. At several first positions in the sequence, the integration of electrical energy, generated by the photoelectric conversion of the photovoltaic panel assembly 11, with time is the maximum value. For example, through simulation software, the integration of electrical energy, generated by the photoelectric conversion of the photovoltaic panel assembly in a certain orientation within 90 days in spring, is the maximum value. Then, the orientation provided by the simulation software is set as the first position. The first position herein changes as the integration time changes.

When the electrical energy supplied by the photovoltaic panel assembly 11 does not reach the first state, the motor driving assembly 13 does not drive the adjustable support assembly 12 to move. For example, when a period of cloudy and rainy weather leads to insufficient electrical energy, the motor driving assembly 13 does not move until the next meteorological condition meeting the photoelectric conversion efficiency appears.

In some embodiments, an operating method for a photovoltaic system 100 is provided, including the following steps: a determination that whether electrical energy available for a motor driving assembly 13 is in a first state is performed; and when the electrical energy is in the first state, an adjustable support assembly 12 is driven by the motor driving assembly 13 to move to a first position. The first state indicates that the electrical energy generated by a photovoltaic panel assembly 11 is sufficient to drive the adjustable support assembly 12 to move. Alternatively, the first state indicates that the electrical energy generated and stored by the photovoltaic assembly is sufficient to drive the adjustable support assembly 12 to move.

In some embodiments, since the power of the motor in the motor driving assembly is extremely low, the adjustment cycle of the photovoltaic panel assembly 11 is in years, a control assembly 14 is electrically connected to the photovoltaic panel assembly 11 and the motor driving assembly 13. Therefore, the control assembly 14 only needs to be configured to complete the orientation adjustment of the photovoltaic panel assembly 11 under the allowable illumination condition. In this case, the electrical energy generated by the photoelectric conversion performed by the photovoltaic panel assembly 11 is sufficient to complete the orientation adjustment of the photovoltaic panel assembly 11, without the involvement of operators and the external power supply, thus the implementation cost of the photovoltaic system 100 is relatively low.

The first state indicates that the electrical energy generated by the photovoltaic panel assembly 11 is sufficient to drive the adjustable support assembly 12 to move. Alternatively, the first state indicates that the electrical energy generated and stored by the photovoltaic panel assembly 11 is sufficient to drive the adjustable support assembly 12 to move.

The first state can be further limited such that the electric energy generated by the photovoltaic panel assembly 11 is sufficient to drive the adjustable support assembly 12 to move to the first position. Alternatively, the electrical energy generated and stored by the photovoltaic panel assembly 11 is sufficient to drive the adjustable support assembly 12 to move to the first position.

The first position can correspond to the area defined by the latitude and longitude of the day, such that the orientation of the photovoltaic panel assembly 11 is directly facing the sun at 12:00 in the noon. In other words, the orientation of the photovoltaic panel assembly 11 is convenient for it to be directly illuminated by the sun at 12:00 in the noon. The first position can also be defined through other spatiotemporal conditions.

In some embodiments, a sequence composed of several first positions is determined according to the longitude and latitude of the photovoltaic system 100 and the solar term phenology. At several first positions in the sequence, the integration of electrical energy, generated by the photoelectric conversion of the photovoltaic panel assembly 11, with time is the maximum value. For example, through simulation software, the integration of electrical energy, generated by the photoelectric conversion of the photovoltaic panel assembly in a certain orientation within 90 days in spring, is the maximum value. Then, the orientation provided by the simulation software is set as the first position. The first position herein changes as the integration time changes.

When the electrical energy supplied by the photovoltaic panel assembly 11 does not reach the first state, the motor driving assembly 13 does not drive the adjustable support assembly 12 to move. For example, when a period of cloudy and rainy weather leads to insufficient electrical energy, the motor driving assembly 13 does not move until the next meteorological condition meeting the photoelectric conversion efficiency appears.

Further, in some embodiments, the first position is determined according to a spatiotemporal condition of the photovoltaic system 100; and when the electrical energy available for the motor driving assembly 13 is restored to the first state, the motor driving assembly 13 drives the adjustable support assembly 12 in a one-time manner to move to the first position.

It can be understood that the photovoltaic system herein has no external power supply, and all the electrical energy required for the operation of the motor driving assembly comes from the light energy real-time converted by the photovoltaic panel assembly 11. The one-time manner herein refers to that due to the meteorological condition, after at least one update of the first position, the adjustable support assembly 12 is directly driven by the motor driving assembly 13 to move to the updated first position. In this way, since the adjustable support assembly 13 directly moves to the latest first position, and the photovoltaic panel assembly 11 is adjusted to its latest first position correspondingly, which can prevent the reduction of the photoelectric conversion efficiency caused by the mismatch of the first position.

Further, in some embodiments, the adjustable support assembly 12 is continuously driven by the motor driving assembly 13 to move to the first position. The angular velocity of rotation of the adjustable support assembly 12 is less than 4 degrees per minute.

In some embodiments, since the photovoltaic panel assembly 11 is directly carried on the adjustable support assembly 12 and there is no decelerating mechanism between the two assemblies, the angular velocity of rotation of the adjustable support assembly 12 is equal to the angular velocity of rotation of the photovoltaic panel assembly 11. It can be understood that the adjustable support assembly 12 is continuously finely tuned by the motor driving assembly 13, and then the photovoltaic panel assembly 11 is finely tuned by the motor driving assembly 13, which can further improve the photoelectric conversion efficiency of the photovoltaic system 100. For example, from the first position corresponding to the vernal equinox to the first position corresponding to the summer solstice, the optimal first position between the two is continuously changing, and the corresponding fine tuning of the orientation of the photovoltaic panel assembly 11 can improve the photoelectric conversion efficiency of the photovoltaic system 100. The angular velocity of rotation of the adjustable support assembly 12 is less than 4 degrees per minute. According to the parameter requirement of the adjustable support assembly 12, the power of the motor in the motor driving assembly 13 can be selected correspondingly, thereby customizing a low-power motor, which makes it possible to deploy the motor driving assembly 13 on a large scale in the photovoltaic system 100 with the adjustment cycle in years.

Further, in some embodiments, the adjustable support assembly 12 is intermittently driven by the motor driving assembly 13 to move to the first position. The angular velocity of rotation of the adjustable support assembly 12 is less than 4 degrees per minute.

In some embodiments, since the photovoltaic panel assembly 11 is directly carried on the adjustable support assembly 12 and there is no decelerating mechanism between the two assemblies, the angular velocity of rotation of the adjustable support assembly 12 is equal to the angular velocity of rotation of the photovoltaic panel assembly 11. It can be understood that the adjustable support assembly 12 is intermittently driven by the motor driving assembly 13, which can reduce the complexity of the control program of the motor driving assembly 13 and the development cost of the control program of the motor driving assembly 13. The angular velocity of rotation of the adjustable support assembly 12 is less than 4 degrees per minute. According to the parameter requirement of the adjustable support assembly 12, the power of the motor in the motor driving assembly 13 can be selected correspondingly, thereby customizing a low-power motor, which makes it possible to deploy the motor driving assembly 13 on a large scale in the photovoltaic system 100 with the adjustment cycle in years.

Further, in some embodiments, an electrical connector is provided between the photovoltaic panel assembly 11 and the control assembly 14.

The electrical connector is mainly used for quickly connection and disconnection between the photovoltaic panel assembly 11 and the control assembly 14. The electrical connector may be in various forms, such as plug-in type, adsorption type, thread matching type, or adhesion type. The specific implementations of the electrical connector obviously do not constitute substantial limitations on the protection scope of the present disclosure.

Further, in some embodiments, the motor driving assembly 13 includes a motor. The motor is mounted at the supporting leg 122.

The motor is mounted at the supporting leg 122, and the position of the center of gravity of the motor does not change, which can improve the effective work done by the motor driving assembly 13.

Further, in some embodiments, the motor driving assembly 13 includes a motor. The motor is mounted at the adjusting mechanism 124.

The mounting of the motor at the adjusting mechanism 124 can make the entire structure compact, reduce the occupied space, and facilitate the detection and maintenance of the photovoltaic system 100 by operators.

Further, in some embodiments, the adjusting mechanism includes a frame and an adjusting rod passing through the frame. The motor includes a motor casing and a motor shaft protruding from the motor casing. The motor casing is matched with the frame. The motor shaft is matched with the adjusting rod.

As shown in FIG. 5, the adjusting mechanism 124 of the jack structure has a diamond frame and an adjusting rod passing through the frame. The rotation of the adjusting rod drives the frame to deform, then drives the angle between the bracket 123 and the ground to change, and ultimately causes a change in the orientation of the photovoltaic panel assembly 11. The motor can include the motor casing and the motor shaft protruding from the motor casing. In some embodiments, the motor casing is matched with the frame. The matching between the motor casing and the frame can be in various forms. The motor casing is matched with the frame through a flange. The simple transformations of the motor casing and the frame envisaged by those skilled in the art fall within the protection scope of the present disclosure. The motor shaft is matched with the adjusting rod. The motor shaft and the adjusting rod can be matched together through various nested structures. These nested structures may be pin-hole matching, internal and external thread nesting, and groove-bump matching. The connection structure between the motor shaft and the adjusting rod may be riveted, welded, etc. The motor shaft and the adjusting rod may be connected together through various couplings. It is appreciated that, the simple transformations of these matching modes fall within the protection scope of the present disclosure.

Further, in some embodiments, the adjusting mechanism 124 includes a frame and an adjusting rod passing through the frame. The motor includes a motor casing and a motor shaft protruding from the motor casing. The motor casing is matched with the frame. The motor shaft and the adjusting rod are integrally formed.

The motor shaft and the adjusting rod can also be integrated formed. The integrated forming herein includes that the motor shaft and the adjusting rod can be distinguished from each other or not.

Further, in some embodiments, the motor driving assembly 13 includes a motor. The photovoltaic panel assembly 11 covers the motor. The photovoltaic panel assembly 11 covers the motor, which can prevent weathering and corrosion of the motor and improve its service life.

Further, in some embodiments, the motor driving assembly includes a motor. The motor includes a motor casing and a motor shaft protruding from the motor casing. The motor is mounted in the following manner: the motor shaft is vertically facing upwards.

The motor shaft is vertically facing upwards, and the motor shell can serve as a load-bearing component. In this way, the center of gravity of the entire motor is located below, which makes it difficult for the motor to fall off and thus improves the safety of the photovoltaic system 100.

Further, in some embodiments, the motor driving assembly 13 includes a motor. The motor includes a motor casing and a motor shaft protruding from the motor casing. The motor is mounted in the following manner: the motor shaft extends horizontally.

The motor shaft extends horizontally and can directly act on the adjusting mechanism or drive the adjusting mechanism by utilizing a simple coupling or connecting structure. The overall structure is simple and has a low implementation cost.

Further, in some embodiments, the motor driving assembly includes a motor. The power of the motor is designed according to the following requirement: the requirement that the maximum angular velocity of rotation of the photovoltaic panel assembly is 4 degrees per minute is met.

According to the parameter requirement of the photovoltaic panel assembly 11, the power of the motor in the motor driving assembly 13 can be selected correspondingly, thereby customizing a low-power motor, which makes it possible to deploy the motor driving assembly 13 on a large scale in the photovoltaic system 100 with the adjustment cycle in years, and to reduce the implementation cost of the photovoltaic system 100.

Further, in some embodiments, the power of the motor is less than 60W.

Due to the decrease in the power of the motor, the overall cost of the corresponding matched structures such as decelerating mechanisms, lubricants, and coils are significantly reduced, which makes it possible to deploy the motor on a large scale in the photovoltaic system 100.

Further, in some embodiments, a decelerating mechanism is provided within the motor. The deceleration ratio of the decelerating mechanism is 1:100~1:1000.

Further, in some embodiments, the deceleration ratio of the external decelerating mechanism of the photovoltaic system 100 is 1:3~1:30.

Due to the decrease in the power of the motor, the decelerating mechanism of the motor itself and the decelerating mechanism of the motor driving assembly can also be reduced, thereby reducing the overall implementation cost.

Further, in some embodiments, the control assembly 14 includes a communication module for updating the operating program of the control assembly 14.

The setting of the communication module enables the control assembly 14 to be provided inside or outside the motor driving assembly 14, thereby providing more choices for user and thus improving the scope of application of the photovoltaic system 100.

In some embodiments, a photovoltaic system 100 is provided, including: a photovoltaic panel module 11 for converting light energy into electrical energy; an adjustable support assembly 12 including a bracket 123 for supporting the photovoltaic panel assembly 11, a support leg 122 for carrying the bracket, and an adjusting mechanism 124 provided between the bracket and the supporting leg; and a motor, mounted at the adjusting mechanism 124, for driving the adjustable support assembly 12 to move in a preset motion.

The mounting of the motor at the adjusting mechanism makes the entire photovoltaic system 100 compact in structure, so as to reduce the occupied space, and facilitate the detection and maintenance by operators.

Further, in some embodiments, the adjusting mechanism includes a frame and an adjusting rod passing through the frame. The motor includes a motor casing and a motor shaft protruding from the motor casing. The motor casing is matched with the frame. The motor shaft is matched with the adjusting rod.

Further, in some embodiments, the adjusting mechanism includes a frame and an adjusting rod passing through the frame. The motor includes a motor casing and a motor shaft protruding from the motor casing. The motor casing is matched with the frame. The motor shaft and the adjusting rod are integrally formed.

Further, in some embodiments, the power of the motor is designed according to the following requirement: the requirement that the maximum angular velocity of rotation of the photovoltaic panel assembly is 4 degrees per minute is met.

According to the parameter requirement of the photovoltaic panel assembly 11, the power of the motor in the motor driving assembly 13 can be selected correspondingly, thereby customizing a low-power motor, which makes it possible to deploy the motor driving assembly 13 on a large scale in the photovoltaic system 100 with the adjustment cycle in years, and to reduce the implementation cost of the photovoltaic system 100.

Further, in some embodiments, the power of the motor is less than 60W.

Due to the decrease in the power of the motor, the overall cost of the corresponding matched structures such as decelerating mechanisms, lubricants, and coils are significantly reduced, which makes it possible to deploy the motor on a large scale in the photovoltaic system 100.

Further, in some embodiments, a decelerating mechanism is provided within the motor. The deceleration ratio of the decelerating mechanism is 1:100~1:1000.

Further, in some embodiments, the deceleration ratio of the external decelerating mechanism of the photovoltaic system 100 is 1:3~1:30.

Due to the decrease in the power of the motor, the decelerating mechanism of the motor itself and the decelerating mechanism of the motor driving assembly can also be reduced, thereby reducing the overall implementation cost.

It should be pointed out that the adjustable support assembly of the photovoltaic system with the adjustment cycle in days has an effective angle greater than or equal to 180° during daily operation. When operating for 25 years, the cumulative total operating range is as follows: $25*365*180°=1642500°$.

The adjustable support assembly of the photovoltaic system with the adjustment cycle in years has an effective angle of rotation is less than or equal to 180° during annual operation. When operating for 25 years, the cumulative total operating range is as follows: $25*180°=4500°$.

The operating time of the motor greatly reduces, such that the cost of the fittings used for the motor, including the decelerating mechanism, lubricants, and coils, can be reduced.

It should also be noted that the terms "including", "containing", or any other variation thereof are intended to cover nonexclusive inclusions, so that a process, method, commodity, or apparatus that includes a series of elements not only includes those elements, but also other elements that are not explicitly listed, or further includes inherent elements for the process, method, commodity, or apparatus. Without further limitations, the elements limited by the statement "include one . . . " do not exclude the existence of other identical elements in the process, method, commodity, or apparatus that includes the said elements.

Those skilled in the art should understand that embodiments according to the present disclosure can be provided as methods, systems, or computer program products. Therefore, the present disclosure may take the form of complete hardware embodiments, complete software embodiments, or embodiments combining software and hardware. Moreover, the present disclosure may take the form of a computer program product implemented on one or more computer available storage medium (including but not limited to disk storage, CD-ROM, optical storage, etc.) containing the computer available program code.

The above are only embodiments of the present disclosure and are not intended to limit the present disclosure. For those skilled in the art, there may be various changes and variations to the present disclosure. Any modifications, equivalent substitutions, improvements, etc. made within the spirit and principles of the present disclosure shall fall within the scope of the claims of the present disclosure.

What is claimed is:

1. An operating method for a photovoltaic system, comprising:

determining whether electrical energy available for a motor driving assembly is in a first state; and driving, by the motor driving assembly, an adjustable support assembly to move to a first position when the electrical energy is in the first state, wherein the first state indicates that the electrical energy generated by a photovoltaic panel assembly is sufficient to drive the adjustable support assembly to move, or indicates that the electrical energy generated and stored by the photovoltaic panel assembly is sufficient to drive the adjustable support assembly to move, and wherein the first position is determined according to a spatiotemporal condition of the photovoltaic system, and the method further comprises:

driving, by the motor driving assembly, the adjustable support assembly in a one-time manner to move to the first position when the electrical energy available for the motor driving assembly is restored to the first state; and continuously driving, by the motor driving assembly, the adjustable support assembly to move to the first position, wherein an angular velocity of rotation of the adjustable support assembly is less than 4 degrees per minute.

2. The operating method according to claim 1, further comprising:

intermittently driving, by the motor driving assembly, the adjustable support assembly to move to the first position, wherein an angular velocity of rotation of the adjustable support assembly is less than 4 degrees per minute.

3. A control assembly for controlling a motor driving assembly to drive an adjustable support assembly to move in a preset motion, wherein the control assembly is configured to control a mode in which a photovoltaic panel assembly supplies electrical energy to the motor driving assembly, when the electrical energy supplied by the photovoltaic panel assembly is in a first state, the control assembly is configured to control the motor driving assembly to drive the adjustable support assembly to a first position, wherein the first state indicates that the electrical energy generated by the photovoltaic panel assembly is sufficient to drive the adjustable support assembly to move, or indicates that the electrical energy generated and stored by the photovoltaic panel assembly is sufficient to drive the adjustable support assembly to move, the first position is determined according to a spatiotemporal condition of the photovoltaic system, and the motor driving assembly is configured to drive the adjustable support assembly in a one-time manner to move to the first position when the electrical energy available for the motor driving assembly is restored to the first state, and the control assembly is configured to control the motor driving assembly to continuously drive the adjustable support assembly to move to the first position, wherein an angular velocity of rotation of the adjustable support assembly is less than 4 degrees per minute.

4. The control assembly according to claim 3, wherein the control assembly further comprises a communication interface for updating an operating program of the control assembly.

5. The control assembly according to claim 3, wherein the control assembly further comprises a storage module for storing an operating program of the control assembly.

6. The control assembly according to claim 3, further comprising:

the control assembly is configured to control the motor driving assembly to intermittently driving the adjustable support assembly to move to the first position, wherein an angular velocity of rotation of the adjustable support assembly is less than 4 degrees per minute.

7. A non-transitory computer-readable storage medium, wherein the computer-readable storage medium stores computer program instructions thereon, the computer program instructions, when being executed by a processor, are configured to:

determine whether electrical energy available for a motor driving assembly is in a first state;

drive, by the motor driving assembly, an adjustable support assembly to move to a first position when the electrical energy is in the first state, wherein the first state indicates that the electrical energy generated by a photovoltaic panel assembly is sufficient to drive the adjustable support assembly to move, or indicates that the electrical energy generated and stored by the photovoltaic panel assembly is sufficient to drive the adjustable support assembly to move; and continuously drive, by the motor driving assembly, the adjustable support assembly to move to the first position, wherein an angular velocity of rotation of the adjustable support assembly is less than 4 degrees per minute.

8. The non-transitory computer-readable storage medium according to claim 7, wherein the computer program instructions are further configured to:

drive, by the motor driving assembly, the adjustable support assembly in a one-time manner to move to the first position when the electrical energy available for the motor driving assembly is restored to the first state, wherein the first position is determined according to a spatiotemporal condition of the photovoltaic system.

9. The non-transitory computer-readable storage medium according to claim 7, wherein the computer program instructions are further configured to:

intermittently drive, by the motor driving assembly, the adjustable support assembly to move to the first position, wherein an angular velocity of rotation of the adjustable support assembly is less than 4 degrees per minute.

\*    \*    \*    \*    \*